April 24, 1928.
C. B. HUGHES
TRUCK BODY MOUNTING
Filed Aug. 23, 1926
1,667,204
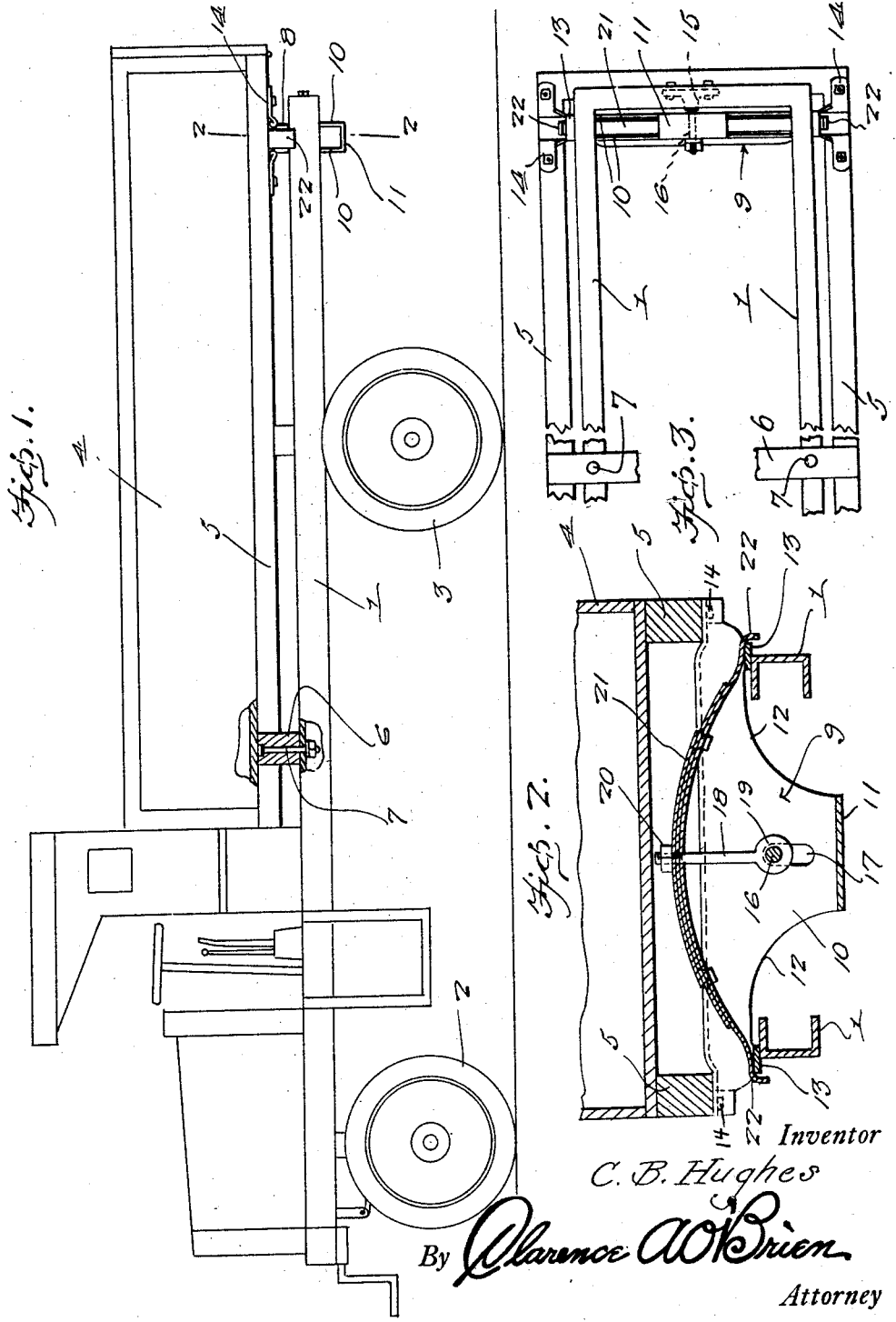
Inventor
C. B. Hughes
By Clarence A. O'Brien
Attorney Patented Apr. 24, 1928.

1,667,204

UNITED STATES PATENT OFFICE.

CHARLES B. HUGHES, OF CHERRYDALE, VIRGINIA.

TRUCK-BODY MOUNTING.

Application filed August 23, 1926. Serial No. 130,948.

This invention relates to a mounting for truck bodies and particularly motor trucks employing a long chassis.

In various types of motor truck constructions as now manufactured and used, particularly heavy duty trucks, a long chassis is employed which in most cases has an overhang beyond the rear axles and wheels. It is present practice to bolt the truck body directly in rigid connection to the chassis frame in all of these constructions.

It is found that through this construction of motor trucks, that the chassis frame is subject to considerable flexing in the use of the truck on rough roads in which the frame will drop with the axle and wheel at either of the rear sides and end portions of the frame, whenever the wheel drops into an excavation or rut.

This has been found to cause considerable damage to the truck body by requiring the parts of the body to be flexed with the frame under the action of the load which quickly causes the separation of the assembled parts of the body, making it necessary to entirely rebuild and reinforce the same.

The present invention is designed to overcome the disadvantage now experienced through the resulting damage to the truck body by the flexing of the chassis frame through the provision of a special means and method for securing the truck body to the chassis frame which will permit the flexing of the chassis frame relative to and away from the truck body so that the truck body may rigidly support the load regardless of the flexing of the chassis frame.

The invention further comprehends the provision of a special mounting for a truck body to secure the same to the chassis in which it is secured to the chassis at three points, the invention being particularly designed to provide a special resilient mounting structure to provide a third point of anchorage for the body on the frame.

The invention also comprehends numerous other objects residing in the details of construction and arrangement of the parts for carrying out the invention which are more particularly pointed out in the following detailed description and in the claims directed to a preferred form of the invention, it being understood however, that various changes may be made in the size, shape and relation of the parts without departing from the spirit and scope of the invention as herein set forth.

In the drawings forming part of this application:

Figure 1 represents a side elevation of an automobile truck in diagrammatic outline, illustrating the truck body and the improved construction for mounting the body on the chassis frame.

Fig. 2 is a vertical longitudinal section showing the construction of the improved resilient spring forming the subject matter of this invention, taken on the line 2—2 of Fig. 1.

Fig. 3 is an inverted plan view of the structure shown in Fig. 2 in its assembled relation with respect to the sill of the body and the chassis frame.

A truck of conventional form is shown in Fig. 1 in which 1 indicates the chassis bars of which there are a pair, one at each side of the frame, as shown in Fig. 3, which are carried by the front and rear wheels 2 and 3. The truck body is indicated at 4 which is usually provided with the sill or supporting frame 5 of suitable rectangular form which is provided at its front end portion with a cross bar 6 adapted to seat on the chassis bars 1 and to receive the securing bolts 7 extending through the cross bar 6 and the sills 5 and to rigidly secure the forward end of the body 4 to the intermediate portion of the chassis frame bars at the opposite sides of the body and intermediate the front and rear wheels 2 and 3 as clearly shown in Fig. 1.

The structure particularly provided by this invention, forms a third point of anchor for the body 4 on the chassis frame 1, and is indicated generally at 8 and clearly shown in Figs. 2 and 3. This anchoring device includes the assembling and supporting member 9 which is substantially U-shape in cross section having the spaced parallel walls 10 joined by the central connecting portion 11 while the end portions are cut away as shown by the curved edge 12. This curved edge extends so that it will overlie the upper faces of the chassis bars 1 as shown in Fig. 2 where the end portions of the walls 10 are joined by the bridging plates or strips 13, which rest on the upper faces of the bars 1 and provide a support for the member 9.

The free ends of the walls 10 of this anchoring member are provided with lateral extensions 14 secured to the sill 5 of the body as shown in Fig. 3, by suitable bolts or the like.

A suitable fitting 15 shown in Fig. 3, is secured to the inside end of the chassis frame 1 and is provided with a stub shaft extension 16 which extends through the vertically elongated slot 17 in the opposite walls of the member 9. A link 18 is provided with an eye on one end thereof as indicated at 19 in Fig. 2, which is adapted to receive the stud 16, while the opposite end thereof is formed to provide means for attaching the link as indicated at 20 to the leaf spring structure 21 and in the central portion of said leaf spring structure.

This leaf spring structure includes a plurality of suitable arcuate leaves as illustrated in Fig. 2, in which the longer leaf extends over the plates or strips 13 and is provided with a specially curved end as indicated at 22 adapted to seat over the connecting strips 13 in a manner shown in Fig. 2.

With this construction it will be seen that the arched spring 21 normally operates through the link 18 on the stub shaft 16 to hold the member 9 with the connecting strips 13 in engagement with the upper faces of the chassis bars 1, and through the connection with the fitting 15 provides a third point of attachment for the truck body on the frame. Should one of the rear wheels 3 drop into a rut while the three remaining wheels are on the level surface, it has been found that the chassis bar 1 over the wheel which drops into the ruts will flex downwardly and follow the wheel.

The three point suspension for the body 4 will permit the ready flexing of the chassis frame 1 which will not be transmitted to the body, but compensated for by this resilient anchor mechanism. It will be understood that at the forward end of the body, when the same is bolted through the anchor slot 17 to the chassis bar, that there is little or no flexing of the chassis frame, which has been found to take place principally at the rear end thereof.

It should therefore be clear from the above description that this invention provides a new and novel means of securing a truck body on the chassis and compensating for the flexibility of the chassis in the mounting of the body thereon, and in which two rigid points of mounting are used with a third resilient anchor.

Having thus described my invention, what I claim as new is:—

1. Means for mounting a vehicle body on a vehicle chassis, comprising means securing the body at a pair of spaced points to said chassis, and resilient means connecting the body with the chassis at a third point spaced from the first mentioned pair of points and normally and yieldingly retaining said body in engagement with said chassis at points at opposite sides of and spaced from the said third point.

2. An anchor construction for securing a vehicle body to a frame, comprising a transverse U-shaped member, having ends secured to the body, a transverse spring secured and operable in the U-shaped member and bearing adjacent to its ends on the end portions of the U-shaped member, and a fitting secured to the chassis or frame and having a slidable engagement in said U-shaped member, said fitting having connection with said transverse spring whereby said transverse spring will permit flexing of the chassis relative to the body and normally retain the body in position on said chassis.

3. In combination, a vehicle body, a chassis, spaced means rigidly securing the side portions of the body to the side portions of the chassis at spaced points adjacent to the forward end of the body, a transverse member connected to spaced parts of the body adjacent to the rear end thereof and having portions normally bearing on the chassis at spaced points adjacent to the rear end of the chassis and also having a portion pendent between the side portions of the chassis, a connection between said transverse member and the rear portion of the chassis, the transverse member being capable of limited vertical play relative to said connection, and a transverse spring coupled to the said connection and bearing on the end portions of the transverse member to yieldingly maintain said end portions on the side portions of the chassis.

In testimony whereof I affix my signature.

CHARLES B. × HUGHES.
his mark